United States Patent [19]

Calvin et al.

[11] Patent Number: 4,625,746

[45] Date of Patent: Dec. 2, 1986

[54] AUTOMATIC FLUID SEALING MECHANISM FOR A CONDUIT WITH A FRANGIBLE CONNECTOR

[76] Inventors: John H. Calvin, 251 Toro Canyon Rd., Carpinteria, Calif. 93013; Jack Y. Wakasa, 4025 Michael Ave., Los Angeles, Calif. 90066

[21] Appl. No.: 717,529

[22] Filed: Mar. 29, 1985

Related U.S. Application Data

[63] Continuation-in-part of Ser. No. 366,048, Apr. 6, 1982, abandoned.

[51] Int. Cl.⁴ .............................................. F16K 13/04
[52] U.S. Cl. ................................. 137/68.1; 137/556.3; 137/614.04; 251/149.2; 251/337
[58] Field of Search ...................... 137/68 R, 69, 556.3, 137/614.01, 614.02, 614.03, 614.04, 614.05; 251/149.2, 337

[56] References Cited

U.S. PATENT DOCUMENTS

| | | | |
|---|---|---|---|
| 1,332,000 | 2/1920 | Pfau | 251/305 X |
| 2,824,755 | 2/1958 | Lamphear | 251/149.2 |
| 3,077,330 | 2/1963 | Lamphear | 251/149.2 X |
| 3,276,471 | 10/1966 | Hagner | 251/305 X |
| 3,409,269 | 11/1968 | Fawkes | 251/306 X |
| 4,141,537 | 2/1979 | Daghe | 251/306 |
| 4,193,295 | 3/1980 | Curran | 137/227 X |
| 4,361,165 | 11/1982 | Flory | 137/69 |

Primary Examiner—Harold W. Weakley
Attorney, Agent, or Firm—Koppel & Harris

[57] ABSTRACT

A sealing mechanism for a pair of conduits held together by means of a frangible connector is described. Each conduit has a center pivoted butterfly valve with valve discs which are spring biased to a closed position. The valve discs are mutually abutting and normally hold each other open, but are released when the frangible connector is broken. Each disc is pivoted about an offset from a pivot support member, and the inner conduit walls are tapered between the open and closed positions of the disc so as to reduce the turning friction between the disc and the conduit walls. A mechanism for positively closing and latching the disc is a closed position is described. This mechanism is contained in a housing which is sealed off from the fluid containing portion of the conduit.

13 Claims, 17 Drawing Figures

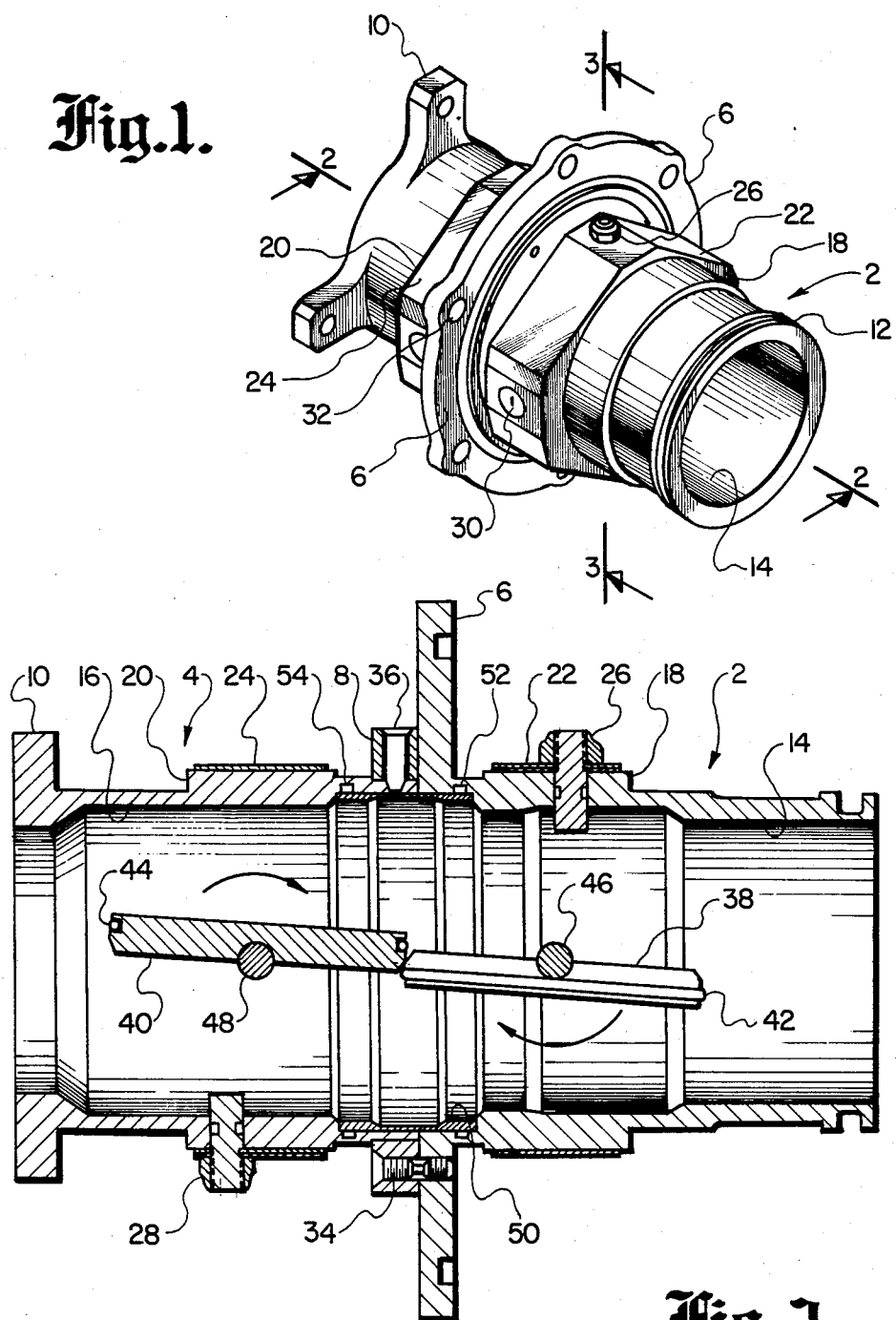

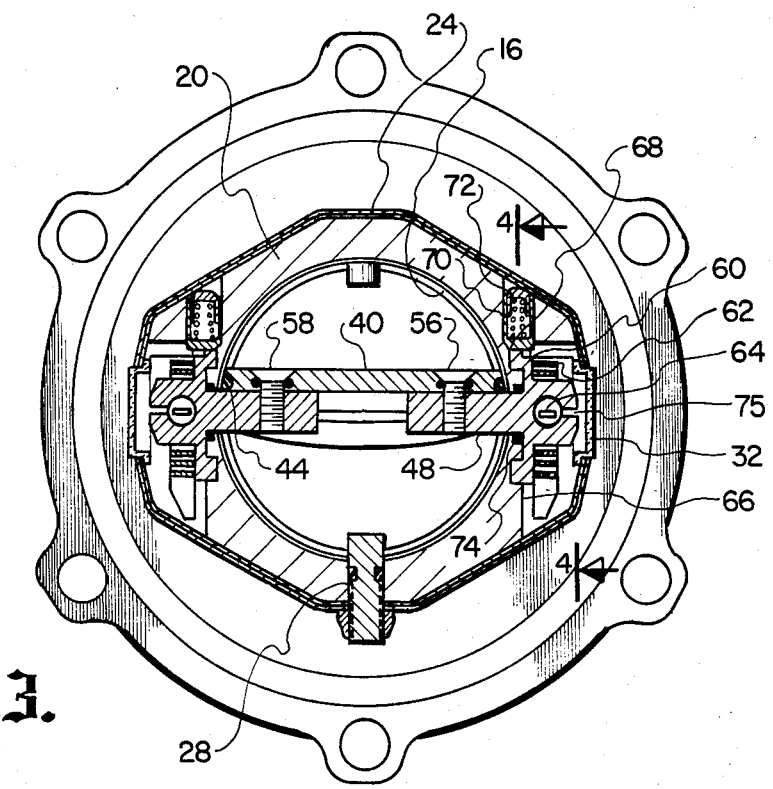
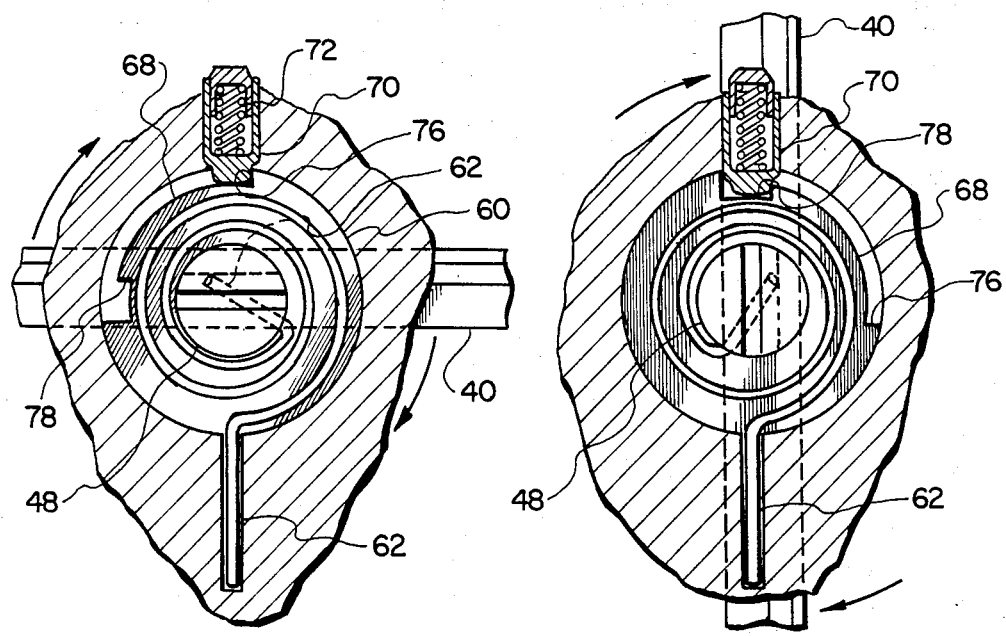
Fig. 3.
Fig. 4.   Fig. 5.

AUTOMATIC FLUID SEALING MECHANISM FOR A CONDUIT WITH A FRANGIBLE CONNECTOR

This application is a continuation-in-part of Ser. No. 366,048, filed Apr. 6, 1982 by the same inventors, now abandoned.

BACKGROUND OF THE INVENTION

1. Field of the Invention

This invention relates to conduit systems having a frangible connector, and more particularly to automatic sealing mechanisms for blocking the outward flow of fluid from the conduit when the connector is broken.

2. Description of the Prior Art

It is often important to prevent leaks of flammable or noxious fluids from a conduit system after the conduit has been ruptured. For example, fuel spillage from an aircraft fuel line after a crash can result in an explosion or severe fire. In order to control such spillage, frangible connectors have been developed with the object of controlling the location in a fuel line at which a break will take place, and then providing a mechanism to seal off the spillage of fuel at the frangible connector as quickly as possible.

The fuel line or other conduit is typically divided into two sections which are joined together by the frangible connector. The connector has a relatively weak linkage holding it together so that, under the stress of a crash or other accident a break will occur at the connector before anywhere else in the conduit. A valve is provided in the conduit sections on either one or both sides of the connector to stop the spillage of fluid when the connector is broken. It is important that the valves be fast operating, reliable and, for aerospace applications, as small and lightweight as possible.

One type of valve assembly for a frangible connector is disclosed in U.S. Pat. No. 4,090,524 issued May 23, 1978 to Allread et al., entitled "Frangible Valved Fitting", and assigned to Aeroquip Corporation. In this patent a flapper valve is provided in the conduit section on each side of the connector. The flapper valves employ valve discs which are pivotally connected at one end and normally held along the inside of the conduit wall. The flaps are retained in this position by a spring loaded sleeve which moves when the connector is broken, releasing the flaps and allowing them to pivot down to seal off their respective conduit sections. While this mechanism provides adequate fluid sealing when it operates properly, the sliding sleeve release mechanism has a considerable area which is subject to corrosion or silting, causing the mechanism to bind up and prevent the flaps from releasing. Furthermore, since the release mechanism occupies a considerable volume along the side of the conduit, a larger overall conduit must be used in order to achieve the same fuel carrying capacity. This in turn results in a greater conduit weight, which is quite detrimental in aerospace applications. Also, because the flaps, sliding sleeve and associated springs are all in the fluid flow path, the valve mechanism presents an appreciable resistance to fluid flow, and there are numerous cavities which can ice up if any water is present in the fuel and prevent the valves from operating properly. Finally, although the flaps are urged closed by a spring mechanism, the device does not have a positive locking mechanism to assure that they remain closed.

Another type of frangible connector valving system is supplied by the Spectrum Company under the trademark BALVAC. In this device a pair of spring loaded ball valves are rotated to a closed position when a frangible connector between the valves is broken. The ball valves and their associated control mechanisms greatly increase the overall diameter of the conduit without increasing its fluid carrying capacity, thus resulting in an unnecessary increase in weight. Furthermore, because the device relies on closely fitted sliding surfaces which extend over large areas, it is subject to binding up and failing to release properly. As in the Aeroquip patent, it is possible for a significant amount of fuel to leak out between the time the connector breaks and the valves are actually closed.

Another disadvantage of the prior art devices is that they generally have a link pin or ball which falls out when the connector is broken. It is possible for the pin or ball to become lodged in the valve mechanism, preventing a proper closure.

SUMMARY OF THE INVENTION

In view of the above problems associated with the prior art, it is an object of the present invention to provide a frangible connector with a novel and improved fluid sealing mechanism that provides a positive sealing action.

Another object is the provision of a frangible connector in which the fluid sealing mechanism has a simple design and places only a small number of moving parts in the fluid flow path.

A further object is the provision of a frangible connector in which the fuild sealing mechanism adds only a relatively small amount to the cross-sectional area of the conduits, thus requiring a smaller and correspondingly lighter conduit.

Yet another object of the invention is the provision of a frangible connector with a fluid sealing mechanism that exhibits only a small turning friction in pivoting to seal off the escape of fluid, and which positively latches the valve in a closed position.

A further object is the provision of a frangible connector in which the operative elements of both the connector and its associated sealing mechanism are easily accessible.

In the accomplishment of these and other objects of the invention, a pair of butterfly valves are mounted in respective fluid carrying conduits in the vicinity of a frangible connector which connects the two conduits. Each valve comprises a sealing disc which is pivotally mounted in its conduit and a spring means which urges the disc to rotate towards a closed position sealing the conduit. The two discs are positioned so that they pivot on mutually intersecting arcs, with each disc normally abutting against the other disc in an open position and preventing each other from closing. When the frangible connector is broken and the two conduits separated, the discs are released and pivoted by their respective springs to closed positions at which they seal off their conduits.

Each disc is mounted to a shaft which extends across a diameter of its conduit and rotates to pivot the disc between closed and open positions. The shaft is laterally offset from the plane of the disc surface which seals against the orifice, and the inner conduit walls are tapered to a diminished crosssectional area from the open to the closed positions of the disc contact surface. This results in a reduction in contact and turning friction between the disc and the inner conduit walls as the disc is closed.

The valves are closed and held closed in a positive manner by means of a compressed coil spring that acts against bearing reception members on the ends of the pivot shafts. The bearing reception members are offset from the shaft axes, and thereby translate the spring force into a turning moment on the shafts and discs. Bearing members interface between the coil springs and the bearing reception members with an angular orientation that causes the valves to close when the conduits are separated, and thereafter utilize the spring force to keep the valves closed. A window in the valve housing permits visual checking of the valve status.

These and other objects and features of the invention will be apparent to those skilled in the art from the following detailed description, taken together with the accompanying drawings, in which:

DESCRIPTION OF THE DRAWINGS

FIG. 1 is a perspective view of a frangible connector with a fluid sealing mechanism constructed in accordance with the invention;

FIGS. 2 and 3 are sectional views taken along lines 2—2 and 3—3 of FIG. 1, respectively;

FIGS. 4 and 5 are sectional views taken along the line 4—4 of FIG. 3 with the valve respectively open and closed;

DETAILED DESCRIPTION OF PREFERRED EMBODIMENTS

Figure 6:
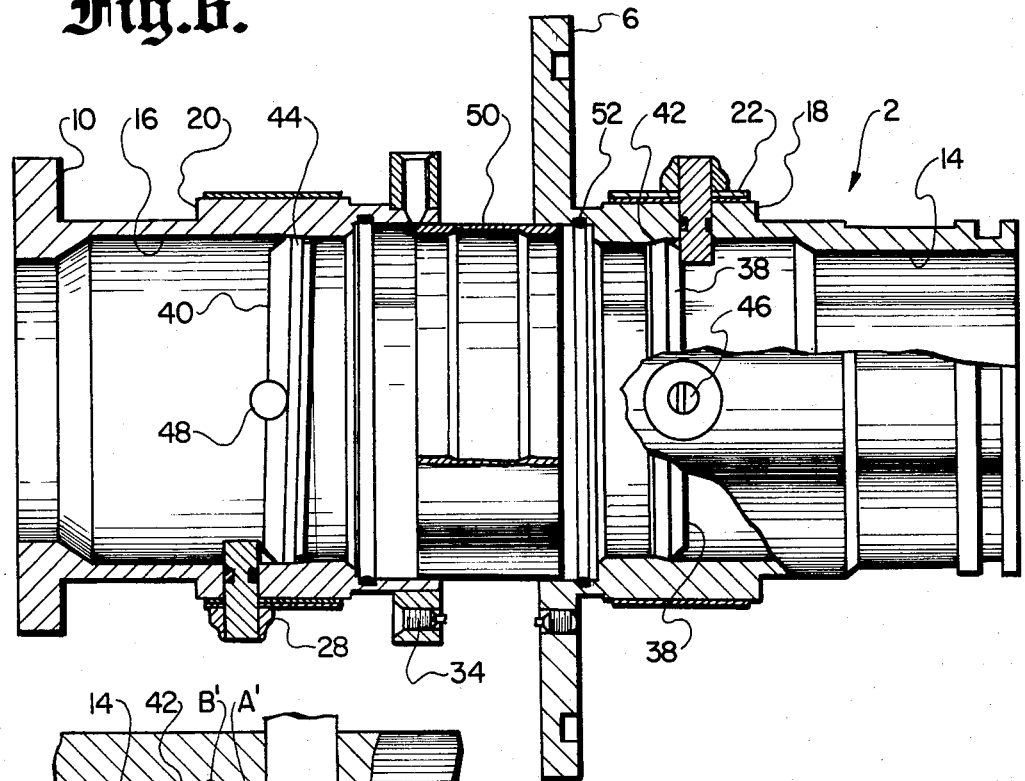
FIG. 6 is a sectional view similar to FIG. 2, with the valves in a closed position.

Referring first to FIGS. 1 and 2, a frangible connector device constructed in accordance with the invention is shown. A pair of conduit sections generally indicated by numerals 2 and 4 have annular flanges 6 and 8, respectively, which abut each other when the conduits are aligned. Conduit 4 is shown with a flange 10 at its opposite end which can be bolted to a fuel tank or the like, while conduit 2 has annular rings 12 around its opposite end for receiving another section of line. Conduits 2, 4 each comprise an inner conduit having inner walls 14, 16, respectively, and outer housings 18, 20, respectively encircling the inner conduits. The housings are enclosed by encapsulation bands 22, 24 which are held respectively in place over their associated housings by threaded bolts 26, 28. Bands 22, 24 are respectively provided with plastic windows 30, 32 which permit the positions of the valves to be viewed from the outside, as described below.

The conduits are formed from any suitable metal or plastic material having the desired strength characteristics and chemically inert to the fuel or other fluid passed through the conduit. The two conduit sections are held together by a plurality of screw links 34, one of which is shown in FIG. 2, which screw into an aligned openings in flanges 6, 8. Additional screws 36 are also set radially into flange 8 to enable the connector to be manually operated.

Mounted inside each conduit section in the vicinity of the frangible connector is a butterfly valve which is held open when the connector is intact, and pivots to seal off its respective conduit section when the connector is broken. The two butterfly valves comprise circular aluminum alloy discs 38, 40 carried in conduit sections 2, 4, respectively. Circular seals 42, 44 are seated into grooves which extend around the periphery of disc 38, 40, respectively. The seals are locked in place in lock holes which are distributed around the circumference of the disc, and are bonded to the disc. O-rings could be used in place of the locked in seals, but O-rings have a tendancy to wash out of the groove if a rupture occurs during high velocity fluid flow through the conduit. Furthermore, locked in seals have been found to provide a greater control of dimensional tolerances than do standard O-rings. When the discs are rotated to a closed position generally orthogonal to the conduit axes, the seals establish circumferential surface contacts with the inner conduit walls to seal off the conduits.

Valve discs 38, 40 are respectively mounted on pivot support members comprising shafts 46, 48, respectively. Each shaft extends substantially along a diameter of its associated conduit perpendicular to the direction of fluid flow, with its axis laterally offset from the plane of the seal encircling the disc. With this arrangement each disc accordingly is rotated about its associated pivot shaft, rather than its internal diameter.

Valve discs 38, 40 are positioned within their respective conduit sections so as to pivot along mutually intersecting arcs when the two sections are brought together. Each disc is springbiased to pivot to a closed position locking the outward flow of fluid through its associated conduit section. The discs are shown in an open position in FIG. 2, with the direction of spring-biased rotation indicated by arrows. In the open position, each disc abuts against the other under the influence of its respective spring bias, so that neither disc can pivot closed. The discs lie in a plane generally parallelt to the conduit axes, and thereby present only a relatively small resistance to the fluid flow. The discs are maintained in this state of mutual tension until the frangible connector is broken and the two conduit sections separated, whereupon the discs rotate approximately 90° from the positions shown in FIG. 2. The inner end of bolt 26 serves as a stop for disc 38 in the closed position, while the inner end of bolt 28 serves as a stop for disc 40.

A sleeve 50 is positioned inside the conduits adjacent the circumferential interface between the two conduit sections, and extends into each conduit section on either side of the interface. Seals 52, 54 are positioned in grooves formed in the inner walls of the conduit sections on each side of the interface, and are contacted by sleeve 50 to form a fluid seal. This sleeve provides additional resistance to bending loads when required, and also acts to delay spillage of fuel from the conduits during the time the discs are closing after the connector has been broken.

The rotational control mechanism for valve disc 40 is shown in FIG. 3; a similar control is provided for disc 38. Disc 40 is mounted on shaft 48, which is formed from two discontinuous shaft segments, by means of screws 56, 58 which screw into each shaft segment. The shaft extends to the right through an opening in the inner conduit wall 16 and into the outer housing, where it terminates in a flange 60. A coil or clock spring 62 is wound about the end of the shaft, with one end of the spring connected to the center of the shaft at 64 and the opposite end of the position, and to prevent it from rotating beyond a position generally parallel to the fluid flow when the valve is open.

An O-ring 74 is placed around shaft 48 to seal the interior of the housing from the fluid inside the inner conduit. At the end of the shaft a slot 76 or other indicium is provided which can be viewed through plastic window 32. Slot 76 provides an indication of the angular position of shaft 48, and accordingly can be used to determine whether the valve is open or closed.

A similar coil spring and cam arrangement is provided inside the housing at the left end of shaft 48, as seen in FIG. 3. Strictly speaking, however, this is a redundancy which is provided for purposes of reliability. The valve would operate properly with a spring and cam mechanism at only one end of the shaft.

As seen in FIG. 3, a majority of the moving parts are contained within the housing external to the inner conduit, and are sealed from the fluid within the conduit. Furthermore, there is very little movement of any surface area against another. There is accordingly little opportunity for the valve mechanism to bind up or fail because of corrosion or icing of its moving parts. The moving parts which are external to the inner conduit occupy only a relatively small volume, thereby permitting the fluid carrying capacity of the device in comparison to its overall diameter and weight to be higher than that attainable with prior art devices.

Referring now to FIG. 4, the cam arrangement referred to above is shown in greater detail with the valve disk in an open position. Cam track 68 formed on flange 60 terminates near its upper end in a vertical stop surface 76. Detent pin 70 rides along the cam track under the urging of coil spring 72, and engages stop 76 to limit an opening rotation of the valve disk substantially beyond a full open position (the arrows in FIG. 4 indicate the direction of a closing rotation; an opening rotation would be opposite to the arrows). A notch 78 is formed in the cam track approximately 90° from stop 76 to latch the disk closed when it is rotated to a vertical closed position, as shown in FIG. 5. In this position detent 70 lodges in notch 78, substantially beyond a full open position (the arrows in FIG. 4 indicate the direction of a closing rotation; an opening rotation would be opposite to the arrows). A notch 78 is formed in the cam track approximately 90° from stop 76 to latch the disc closed when it is rotated to a vertical closed position, as shown in FIG. 5. In this position detent 70 lodges in notch 78, positively latching the valve closed and preventing disc 48 from rotating back in a counter-clockwise direction.

FIG. 6 shows the frangible connector after it has been broken and the two conduit sections separated somewhat. Valve discs 38, 40 have been released and rotated clockwise to a general vertical position at which their respective seals 42, 44 form a circumferential seal with the inner walls of their respective conduit sections. Sleeve 50 is still in place, preventing fluid from escaping while the valves closed. With a proper design sleeve 50 will limit the fluid spillage that does occur essentially to the fluid between the two valves at the time of rupture.

Figure 7:
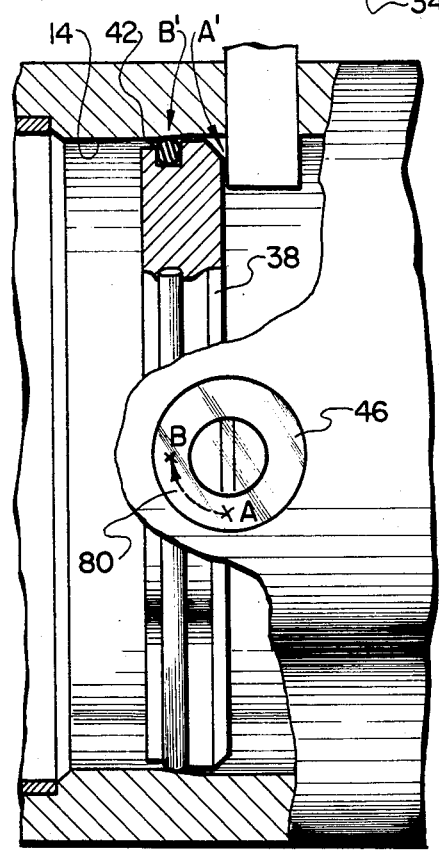
FIG. 7 is a partially sectioned view showing the manner in which the valve disc seals its associated conduit.

Details of the sealing arrangement between disc 38 and the inner conduit wall 14 are shown in FIG. 7. It can be seen that, with the disc in a closed position, the plane of seal 42 is laterally offset from the axis of shaft 46 in the direction of the conduit axis, whereas with the valve open the disc and seal are centered substantially directly below the shaft axis (as seen in FIG. 2). In rotating to a closed position, the center diameters of seal 42 and disc 38 which are orthogonal to the conduit axis traverse an arc indicated by dashed line 80 between points A and B. This arc has a directional component along the conduit axis, as opposed to a disc rotating about an internal axis. This is an important feature of the invention, as it helps to insure a relatively small amount of turning friction between the disc and the inner conduit wall as the disc rotates closed. The diameter and cross-sectional area of the inner conduit wall is diminishingly tapered from projection A' to projection B' of points A and B on the inner conduit wall. This taper reduces the contact pressure between seal 42 and the inner conduit wall around point A as the disc begins to rotate, as compared to the contact pressure after the disc has closed. Because of the offset between the shaft axis and the seal diameter parallel to that axis, the locus of contact between the seal and the inner conduit wall shifts as the disc is closed from point A to a circumference extending through point B. Since the cross-sectional area of the inner conduit surface is tapered from a larger area at point A to a smaller area at point B, the contact between the seal and the conduit wall is reduced or eliminated entirely when the valve is open, and yet a tight fluid seal between the seal and the conduit wall is achieved when the valve is closed. This in turn reduces the turning friction between the seal and conduit wall as the valve is closed, especially in the initial stages of closing.

Figure 8:
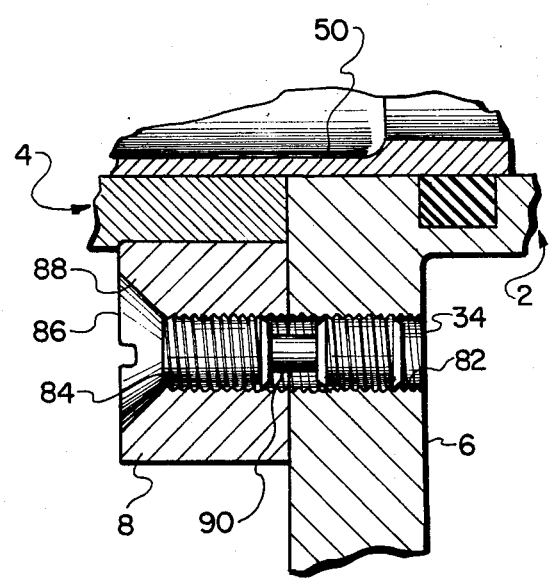
FIG. 8 is a sectional view of a frangible link arrangement used to hold the connector together.

The mechanism by which the two conduit sections are joined in a frangible connection are shown in FIG. 8. A plurality of threaded openings 82, 84 are formed in mutual alignment in conduit flanges 6, 8, respectively. Preferably three such openings are formed in each flange. A threaded link 34 is screwed into each aligned pair of openings, with a head 86 on the link abutting against a countersink 88 in one of the openings to enable the flanges to be tightened together by rotating the link. An intermediate portion 90 of each link has a reduced diameter, and extends across the abutment between flanges 6, 8. The diameter of intermediate portion 90 is selected so that the links will break under a predetermined load such as that which might be expected in an aircraft crash, and thus initiate a break in the conduit at the frangible connector where proper sealing can take place before the conduit breaks elsewhere. Links 34 have the advantage of being more easily replaceable than prior art coupling devices.

Figure 9:
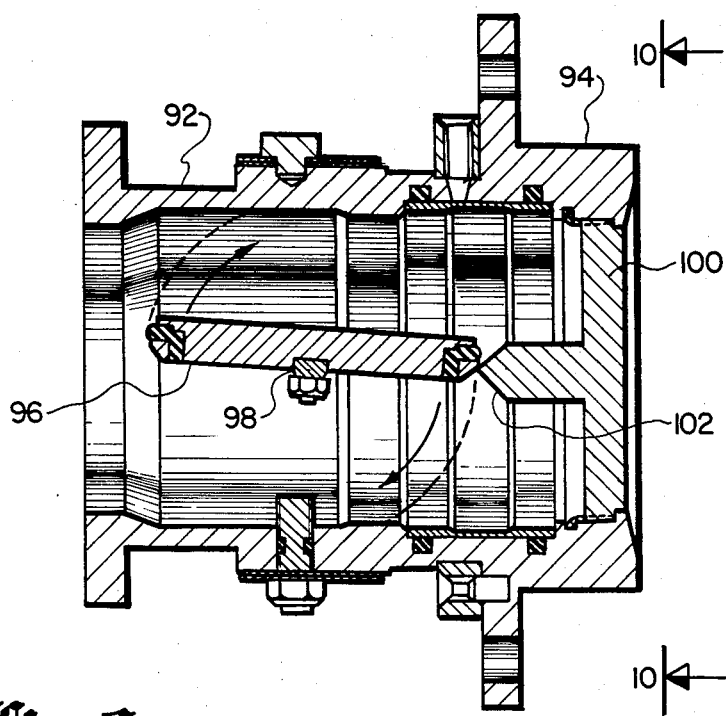
FIG. 9 is a sectional view of another embodiment of the invention with only one valve.

Another embodiment of the invention is shown in FIG. 9. In this embodiment it is desired that only one of the conduit sections be sealed off, and that the other section remain open in case of a break in the connector. In the embodiment shown it is desired to seal the left hand conduit section 92, but to leave right hand section 94 open. Accordingly, a butterfly valve disc 96 of essentially similar construction to the disc described previously is mounted within conduit section 92 on a pivot shaft 98. Disc 96 is spring biased in a manner similar to the previous embodiment to rotate clockwise to a closed sealing position when the frangible connector is broken and the two conduit sections separated.

Figure 10:
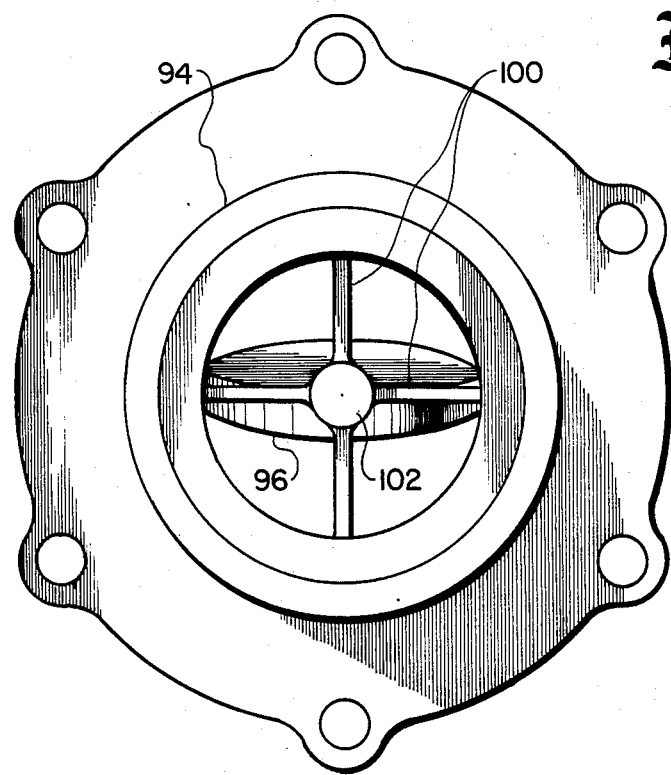
FIG. 10 is a side elevation view taken along the lines 10—10 of FIG. 9.

The right hand conduit section 94 has a network of webs 100 supporting a central blocking member 102 which extends toward disc 96 and holds the disc in an open position when the connector is intact. Blocking member 102 extends axially through the conduit so that it intersects the rotational arc of disc 96, which normally abuts against it in an open position. The disc is released when the connector is broken and blocking member 102 moved away from its blocking position, and the flap then rotates closed to form a tight seal with the inner conduit wall. Further details of the web network which supports member 102 are shown in FIG. 10.

An improved embodiment of the invention, in which a mechanism is provided to produce a greater valve closing force and to positively hold the valve in a closed position, is shown in FIGS. 11-17. This embodiment also reduces the overall size of the frangible connector, which is very important in applications such as helicopter fuel lines. Elements in this embodiment which correspond to elements in a previously described embodiment are identified by the same reference numerals, with the addition of a prime.

Figure 11:
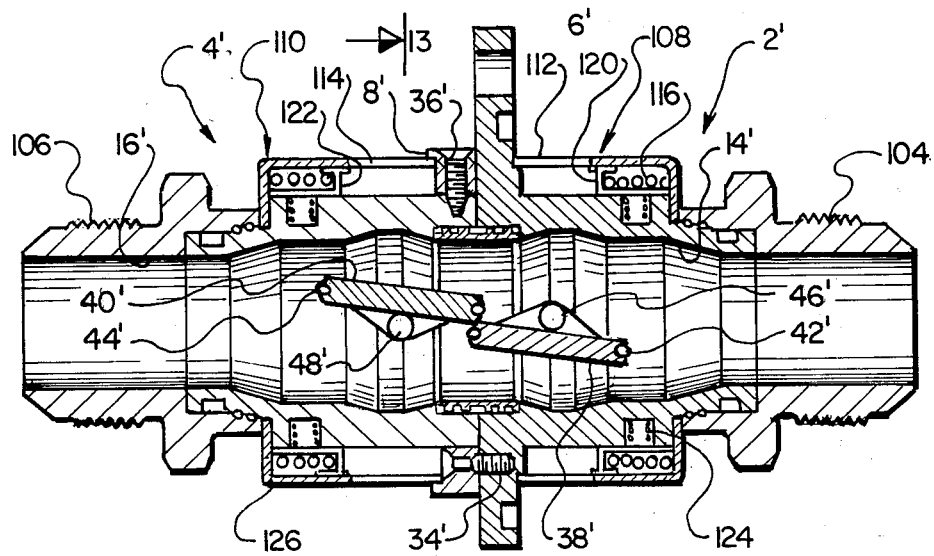
FIGS. 11 and 12 are sectional views of another embodiment of a frangible connector in which a positive sealing action is provided, respectively showing the connector intact and separated.

Referring first to FIG. 11, a pair of conduit sections generally indicated by numerals 2' and 4' have annular flanges 6' and 8', respectively, which abut each other when the conduits are aligned. Threaded connectors 104 and 106 are provided at the opposite ends of conduit 2' and 4' for connection to fuel lines or the like. Conduits 2' and 4' each comprise inner conduits having inner walls 14' and 16', respectively, and outer housings 108, 110 respectively encircling the inner conduits. The housings 108, 110 include clear annular plastic bands 112, 114, respectively, which form windows to enable a portion of the housing interiors to be viewed. The two conduit sections are held together by a plurality of screw links 34', while additional screws 36' are set radially into flange 8' to enable the connector to be manually operated.

Butterfly valves are provided within each conduit section as in FIG. 1 to seal off their respective conduit sections when the connector is broken. The butterfly valves include circular aluminum discs 38', 40', respectively, with circular seals 42', 44' seated in grooves which extend around the peripheries of discs 38', 40'.

Valve discs 38', 40' are mounted on pivot support members comprising shafts 46', 48', respectively. As in the previous embodiment, each shaft extends substantially along a diameter of its associated conduit perpendicular to the direction of fluid flow, with its axis laterally offset from the plane of the seal encircling the disc. Each disc is rotated about its associated pivot shaft, rather than about its internal diameter.

The principal advantage of this embodiment stems from the spring bias mechanism used to close the valves. As opposed to the pair of separate clock springs wound about the opposite ends of each shaft as previously described, single coil springs 116, 118 are lodged respectively within housings 108, 110 in the two conduit sections. Bearing members 120, 122 at the forward end of each coil spring (the end facing the frangible connection) are urged against corresponding bearing reception members on the opposite ends of pivot shafts 46', 48'. The coil springs are compressed to a flexed state between the rear housing wall and the bearing reception members on the shafts, with the intersection of valve discs 38', 40' preventing the valves from closing when the conduits are joined. Latching mechanisms 124, 126 are provided in the respective conduit walls to assist in latching the valves to a closed position when they have operated.

Figure 12:
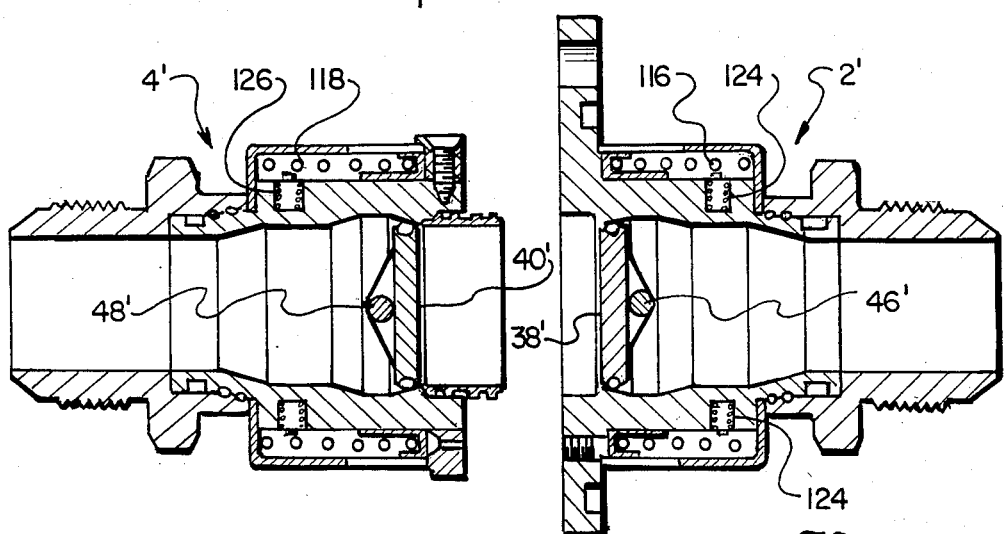

FIG. 12 is similar to FIG. 11, but shows the conduits separated from each other and the valves in a closed position. As explained below, coil springs 116, 118 expand from their initially compressed positions to close the valves. This produces a considerably greater closing spring force than with the previous embodiments, in addition to other advantages to be described.

Figure 13:
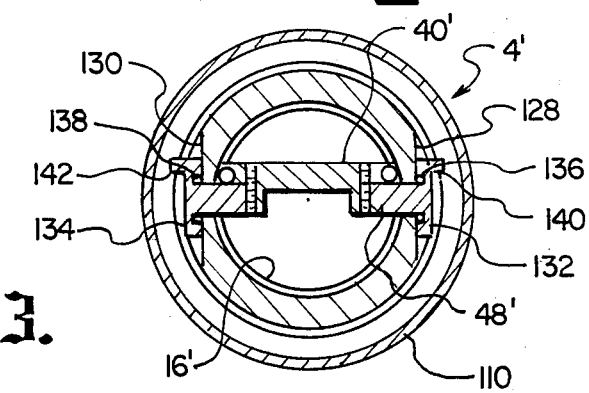
FIG. 13 is a sectional view taken along the line 13—13 of FIG. 11.

Referring now to FIG. 13, a cross-sectional view of conduit 4', valve disc 40' and pivot shaft 48' is shown. The opposite ends of shaft 48' extend through the inner conduit wall, with chamfered sections 128, 130 formed in the outer conduit wall where the shaft protrudes. The opposite ends of the shaft terminate in plates 132, 134 overlying the chamfered outer conduit surface. Rotation of the shaft relative to the conduit is facilitated by the provision of O-rings 136, 138 in the plate adjacent the outer conduit surface. Bearing reception members for the coil spring are proivded on the outer surfaces of plates 132, 134 in the form of upstanding ribs 140, 142, the ribs being offset from the shaft axis and generally coplanar with valve disc 40'.

Figure 14:
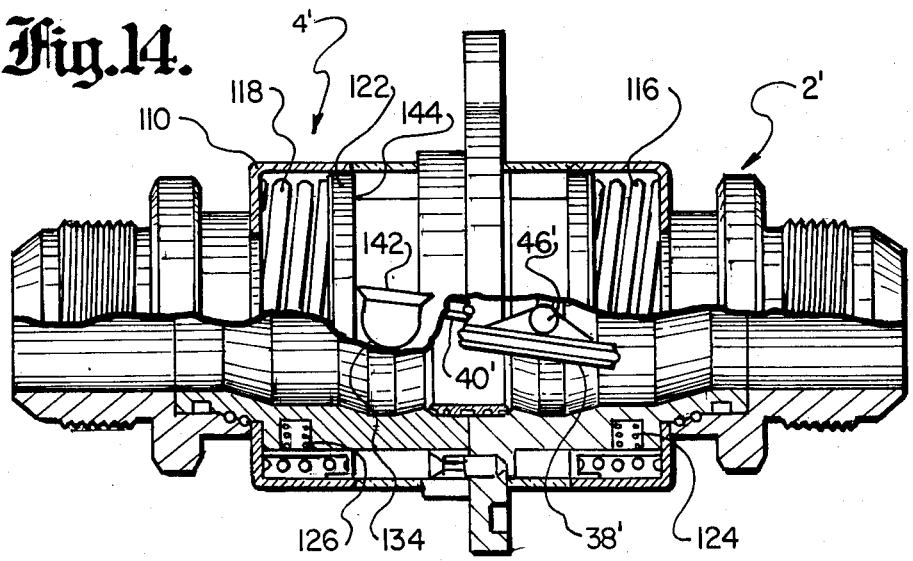
FIG. 14 is a partially sectioned view similar to FIG. 11, but showing the positive sealing mechanism.
Figure 15:
FIGS. 15 and 16 are enlarged fragmentary views of the valve operating mechanism employed in the embodiment of FIG. 11, with the valve respectively open and closed.

Referring now to FIGS. 14 and 15, partially sectioned views are shown which illustrates the relationship between the coil springs and the valve closing mechanism. Referring to the left hand side of the figures, the bearing member 122 is provided in the form of an annular cap which is placed over the inner end of coil spring 118. Cap 122 has an inward facing, substantially annular ring-shaped bearing surface 144 (best seen in FIG. 17) which encircles the inside of the left hand conduit. Bearing surface 144 is urged by spring 118 against the outer edge of rib 142 on the shaft plate 134. The rib, which is located outside the conduit within outer housing 110, is parallel to disc 40' on the inside of the conduit. As shown in the figures, rib 142 and disc 40' both lie in a plane which forms a small but greater than zero angle with the conduit axis. Since the force vector of coil spring 118 acts through bearing cap 122 against rib 142 in a direction which is substantially parallel to the conduit axis, and rib 142 is laterally offset from the shaft axis, the spring imparts a turning moment to the shaft. When the valve is released by a separation of the two conduit sections, this turning moment forces the left hand valve disc 40' to rapidly rotate in a clockwise direction until it reaches a vertical orientation, sealing the conduit.

Figure 16:

The relationship between the bearing cap 122 and bearing receiving rib 142 with the valve closed is shown in FIG. 16. It should be noted that the rear rib bearing reception surface 146 lies flat against the cap bearing surface 144 when the valve is closed. Since coil spring 118 is still under compression and therefore continues to exert a forward directed force on bearing cap 122, the flat abutment of forward bearing surface 144 against the rear rib surface 146 prevents the valve from rotating in either direction after it has been closed. This eliminates the need for a separate stop member, as in the previous embodiments, to prevent over-rotation.

Figure 17:
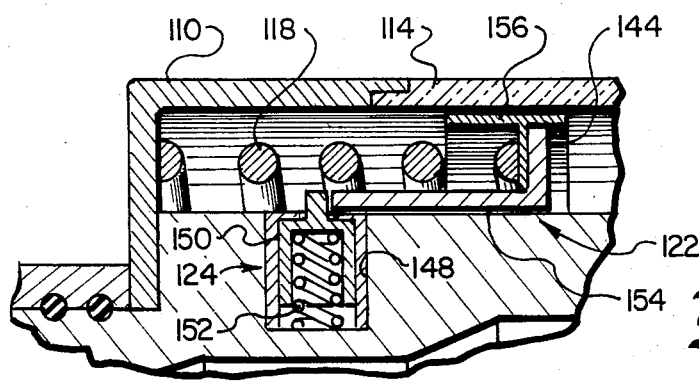
FIG. 17 is an enlarged fragmentary view of a valve latching mechanism employed in the embodiment of FIG. 11.

Turning now to FIG. 17, a closeup of the bearing member 122 for the left hand conduit is shown in a valve closed position. In this view details of latching mechanism 124 can be seen. Latch 124 comprises a cavity 148 in the outer conduit wall, with a pin member 150 lodged in the cavity and urged outward therefrom by a coil spring 152. Bearing member 122 includes a rearward extending flange 154 which has a lateral surface that is adjacent and parallel to the outer conduit wall. With the valve open, flange 154 is positioned over latch 124, holding pin 150 inside the cavity. As the valve closes, the lateral surface of flange 154 rides over the head of pin 150 until the coil spring 118 reaches its forwardmost position (shown in FIG. 17). In this position pin 150 is just to the rear of flange 154, and protrudes out from cavity 148 under the force of spring 152. It projects to a position just to the rear of flange 154, thereby preventing the bearing member from backing up and the valve from opening once it has closed. Since the main coil spring 118 also keeps a positive closing force on the valve, latch 24 acts as a backup.

To enable a visual observation of the status of the valve to determine whether it has closed, a visual indicium such as a colored T-shaped member 156 is disposed adjacent the forward end of bearing cap 122 is shown in FIG. 17. Unlike the steel bearing cap, which does not support color well, visual member 156 may be formed from a material such as anodized aluminum which can successfully be colored. When the valve closes, bearing cap 122 moves forward far enough to expose the visual member under outer window 114, indicating that the valve has operated. With the valve open, bearing cap 122 is positioned to the left under the solid portion of outer housing 110, hiding the visual member from view.

While the above description of the valve operation has been limited to the left hand conduit, it should be understood that the valve in the right hand conduit is constructed and operates in substantially the same manner. Also, while a dual conduit connector is shown, the same type of valve construction could be used for a single conduit application, such as that illustrated in FIGS. 9 and 10. In either case, the embodiment of FIGS. 11-17 provides an improved valve operation and occupies a smaller volume than the previously described embodiments.

While particular embodiments of the invention have been shown and described, various modifications and alternate embodiments will be apparent to those skilled in the art. Accordingly, it is intended that the invention be limited only in terms of the appended claims.

We claim:

1. An automatic fluid sealing mechanism for a pair of conduits which are connected together by a frangible connector means, comprising:
    a first butterfly valve comprising a first sealing disc mounted in the first conduit on a first pivot shaft in the vicinity of the frangible connector, a first plate carried on an end of the first pivot shaft and extending when the valve is open from the shaft pivot axis to a location laterally offset from the shaft pivot axis relative to the conduit axis and adapted to pivot with the shaft, a first rib member extending outward from the plate and laterally to opposite sides of the shaft axis, the rib member including a substantially flat bearing reception surface which faces away from the conduit connection along a plane substantially normal to the conduit axis when the valve disc is rotated closed, a first annular spring housing in the first conduit, a first coil spring positioned under compression in the first spring housing, and a first annular bearing member carried at an end of the first coil spring, the bearing member including a substantially flat bearing surface which is urged in a direction generally parallel to the conduit axis against the rib member by the coil spring to produce a turning moment that urges the first pivot shaft and disc to pivot to a closed position sealing the first conduit, the bearing surface lying substantially flat against the rib member's bearing reception surface under the spring force of the coil spring when the valve is closed and restraining the disc from rotating in either direction away from a closed position,
    a second butterfly valve comprising a second sealing disc mounted in the second conduit on a second pivot shaft in the vicinity of the frangible connector, a second plate carried on an end of the second pivot shaft and extending when the second valve is open from the second shaft pivot axis to a location laterally offset from said axis relative to the second conduit axis and adapted to pivot with the second shaft, a second rib member extending outward from the plate and laterally to opposite sides of the second shaft axis, the second rib member including a substantially flat bearing reception surface which faces away from the conduit connection along a plane substantially normal to the conduit axis when the second valve disc is rotated closed, a second annular spring housing in the second conduit, a second coil spring positioned under compression in the second spring housing, and a second annular bearing member carried at an end of the second coil spring, the second bearing member including a substantially flat bearing surface which is urged in a direction generally parallel to the conduit axis against the second rib member by the second coil spring to produce a turning moment that urges the second pivot shaft and disc to pivot to a closed position sealing the second conduit, the bearing surface lying substantially flat against the second rib member's bearing reception surface under the force of the second coil spring when the second valve is closed and restraining the second disc from rotating in either direction away from a closed position,
    said valve discs being positioned within their respective conduits to pivot on mutually intersecting arcs, each disc normally abutting against the other disc in an open position and preventing the other disc from closing, said discs being released and pivoted to closed sealing positions under the influence of their respective coil spring means when the frangible connector is broken and the two conduits are separated.

2. The fluid sealing mechanism of claim 1, each of said discs lying generally in the same plane as its respective rib member and when pivoted to a closed position forming a fluid seal with its periphery sealingly contacting the inner wall of its respective conduit along a respective contact surface, each of said pivot shafts providing a pivot axis for its respective disc which is laterally offset from the plane of the disc contact surface, said discs when closed being positioned between their respective pivot shafts and the frangible connector.

3. The fluid sealing mechanism of claim 2, wherein the inner conduit walls are tapered to a diminished cross-sectional area from the open to the closed positions of said disc contact surfaces, whereby the disc contact surfaces in an open position establish a lesser contact pressure with the conduit walls than in a closed position, and the turning friction between the discs and the conduit wall as the discs are closed is accordingly reduced.

4. The fluid sealing mechanism of claim 1, wherein said plates and rib members are provided at both ends of the first and second pivot shafts, and the bearing member for each coil spring comprises a substantially annular ring-shaped member bearing against its respective rib member.

5. The fluid sealing mechanism of claim 1, each of said conduits comprising an inner conduit and a housing affixed externally to said inner conduit, each of said pivot shafts extending across its respective inner conduit and into the housing at either end, the coil spring means for each valve being disposed within the housing and acting upon the bearing reception member for that valve out of the fluid flow path in the inner conduit.

6. The fluid sealing mechanism of claim 5, each bearing member including a forward bearing surface contacting its respective bearing reception member, and a flange having a lateral surface which extends back from the bearing surface, further comprising a latching member positioned in each conduit at a position which is adjacent its respective lateral flange surface when its respective valve is open and just to the rear of its respective flange when its respective valve is closed, and a bias spring means for each latching member urging the latching member against the lateral flange surface so that each latching member advances behind its respective flange when the valve is closed to latch the bearing member in a closed position.

7. The fluid sealing mechanism of claim 5, each valve having opened and closed states, each housing including an outer transparent window, and each bearing member including an associated indicium which moves with the bearing member and is visible through the window when the valve is in one state but not in the other to permit the state of the valve to be determined.

8. An automatic fluid sealing valve for an open ended fluid carrying conduit, comprising:

a sealing disc having an outer circumference which conforms to the inner conduit wall and is formed from a sealing material, a shaft mounting said disc within the conduit generally along at least a portion of a diameter of the disc, said shaft providing a pivot axis for the disc which is laterally offset from the plane of said outer disc circumference, a plate carried on an end of the shaft and extending from the shaft pivot axis to a location offset from the shaft pivot axis and adapted to pivot with the shaft, a rib member extending outward from the plate and laterally to opposite sides of the shaft axis, the rib member including a substantially flat bearing reception surface which faces away from the open end of the conduit along a plane substantially normal to the conduit axis when the valve disc is rotated closed, an annular spring housing, a coil spring positioned under compression in the spring housing, and an annular bearing member carried at an end of the coil spring, the bearing member including a substantially flat bearing surface which is urged in a direction generally parallel to the conduit axis against the rib member by the coil spring, to produce a turning moment that urges the shaft and disc to pivot to a closed position sealing the conduit, the bearing surface lying substantially flat against the rib member's bearing reception surface under the spring force of the coil spring when the valve is closed and restraining the disc from rotating in either direction away from a closed position, said disc being adapted to be held in an open position, and when released pivoting under the influence of the coil spring to a closed fluid sealing position.

9. The valve of claim 8, wherein the inner conduit walls are tapered to a diminished cross-sectional area from the open to the closed positions of said disc diameter, whereby the outer disc circumference in an open position establishes a lesser contact pressure with the inner conduit wall than in a closed position, and the turning friction between the disc and the conduit wall as the disc is closed is accordingly reduced.

10. The valve of claim 9, the conduit comprising an inner conduit and a housing affixed externally to the inner conduit, the shaft extending across the inner conduit and into the housing at either end, the coil spring means being disposed within the housing and acting upon the bearing reception member out of the fluid flow path in the inner conduit.

11. The valve of claim 10, the bearing member including a forward bearing surface contacting the bearing reception member, and a flange having a lateral surface which extends back from the bearing surface, further comprising a latching member positioned in the conduit at a position which is adjacent the lateral flange surface when the valve is open and just to the rear of the flange when the valve is closed, and a bias spring means urging the latching member against the lateral flange surface so that the latching member advances behind the flange when the valve is closed to latch the bearing member in a closed position.

12. The valve of claim 10, the valve having opened and closed states, the housing including an outer transparent window, and the bearing member including an associated indicium which moves with the bearing member and is visible through the window when the valve is in one state but not the other to permit the state of the valve to be determined.

13. The valve of claim 8, wherein said plates and rib members are provided at both ends of the shaft, and the bearing member comprises a substantially annular ring-shaped member bearing against the rib member.

* * * * *